United States Patent

Yoshida

[11] Patent Number: 6,122,122
[45] Date of Patent: Sep. 19, 2000

[54] READ/WRITE APPARATUS PROVIDED WITH HEAD AND SECTOR ADDRESS RECOGNITION MEANS AND AN ADDRESS RECOGNITION METHOD FOR THE SAME APPARATUS

[75] Inventor: Osamu Yoshida, Higashine, Japan

[73] Assignee: Fujitsu Limited, Kawasaki, Japan

[21] Appl. No.: 08/957,404

[22] Filed: Oct. 23, 1997

Related U.S. Application Data

[63] Continuation of application No. 08/564,881, Nov. 30, 1995, abandoned.

[30] Foreign Application Priority Data

Mar. 20, 1995 [JP] Japan .................................. 7-061322

[51] Int. Cl.[7] .............................. G11B 5/09; G11B 15/12
[52] U.S. Cl. ................................................ 360/51; 360/63
[58] Field of Search ................................................ 360/63

[56] References Cited

U.S. PATENT DOCUMENTS

| | | | |
|---|---|---|---|
| 5,280,462 | 1/1994 | Yokogawa | 369/30 |
| 5,581,418 | 12/1996 | Hasebe | 360/51 |

FOREIGN PATENT DOCUMENTS

| | | |
|---|---|---|
| 0522750 | 1/1993 | European Pat. Off. . |
| 2-44586 | 2/1990 | Japan . |
| 271458 | 12/1990 | Japan . |
| 3-178093 | 8/1991 | Japan . |
| 6131856 | 5/1994 | Japan . |

Primary Examiner—W. Chris Kim
Attorney, Agent, or Firm—Greer, Burns & Crain, Ltd.

[57] ABSTRACT

A sector address recognition part recognizes a sector address in a magnetic disk where ID areas for storing sector address information and head address information are omitted. This is accomplished by generating a sector pulse when a predetermined count is reached after a detection of a servo mark and when an interval between adjacent servo marks included in servo information that also includes cylinder address information is a preset interval. A head identifier recognition part recognizes a head identifier on the basis of, for example, positions at which the servo information is recorded.

12 Claims, 18 Drawing Sheets

| BEFORE SWITCHING \ AFTER SWITCHING | HEAD 0 | HEAD 1 | HEAD 2 | HEAD 3 |
|---|---|---|---|---|
| HEAD 0 |  | $\dfrac{17}{16}$ | $\dfrac{19}{16}$ | $\dfrac{23}{16}$ |
| HEAD 1 | $\dfrac{31}{16}$ |  | $\dfrac{18}{16}$ | $\dfrac{22}{16}$ |
| HEAD 2 | $\dfrac{29}{16}$ | $\dfrac{30}{16}$ |  | $\dfrac{20}{16}$ |
| HEAD 3 | $\dfrac{25}{16}$ | $\dfrac{26}{16}$ | $\dfrac{28}{16}$ |  |

UNIT : NUMBER OF FRAMES

| AFTER SWITCHING / BEFORE SWITCHING | HEAD 0 | HEAD 1 | HEAD 2 | HEAD 3 |
|---|---|---|---|---|
| HEAD 0 |  | 2 | 4 | 8 |
| HEAD 1 | 0 |  | 3 | 7 |
| HEAD 2 | -2 | -1 |  | 5 |
| HEAD 3 | -6 | -5 | -3 |  |

UNIT: DIFFERENCE IN FRAME NUMBER

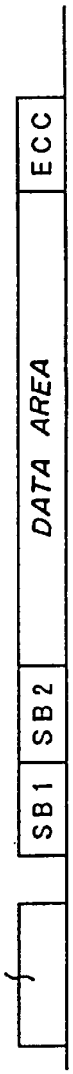

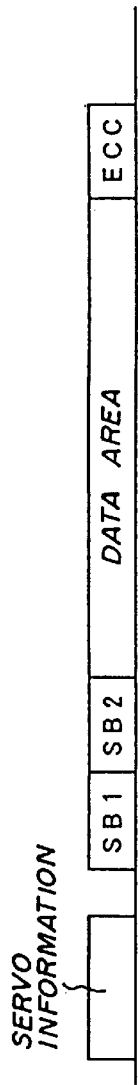

READ/WRITE APPARATUS PROVIDED WITH HEAD AND SECTOR ADDRESS RECOGNITION MEANS AND AN ADDRESS RECOGNITION METHOD FOR THE SAME APPARATUS

This application is a continuation of application(s) Ser. No. 08/564,881 filed on Nov. 30, 1995, abandoned.

BACKGROUND OF THE INVENTION

1. Field of the Invention

The present invention relates to read/write apparatuses, and more particularly to a read/write apparatus in which information is written to and read from a sector having a predetermined address, using a head associated with a target recording surface.

In most magnetic disk drives that are used recently, information is written to and read from a magnetic disk (recording medium) according to one of the following schemes: a servo surface servo method in which servo information and the like is written on a surface of a disk dedicated for servo information; and a data surface servo method in which servo information and the like is recorded on a data surface. The data surface servo method allows a reduction in the number of magnetic disks and an increased storage capacity. In either method, information is written to a data area in a predetermined sector. Servo information for positioning the corresponding head is recorded in a servo area. Information related to writing and reading (addresses, etc.) is recorded in an ID area.

Demand for further increases in storage capacity makes it necessary to consider the possibility of omitting the ID area, particularly in the data surface servo method. In this regard, it is necessary not only to transfer the information in the ID area to another area, but also to reduce the volume of information recorded.

2. Description of the Related Art

Conventionally, when a magnetic disk drive is used as a read/write apparatus for a host system such as a personal computer or other information processing apparatus, the host computer or other information processing apparatuses records using the magnetic disk drive by dividing data into 512-byte units. Addresses are written, as identification information for differentiating between 512-byte data from each other, in the ID area where information relating to writing and reading is recorded. Therefore, the ID area always precedes the corresponding 512-byte data area. When a reading or writing operation is performed, the ID area is always referred to immediately before the data area is accessed.

A magnetic disk drive is generally equipped with one or a plurality of magnetic disks, and a reading/writing head is provided for the recording surfaces of each of the magnetic disks. Switching between the heads in order to access the magnetic disk is effected by a head IC comprising a register or the like.

FIG. 1 explains a disk format according to the conventional data surface servo method. Referring to FIG. 1, a sector on each of the tracks of the magnetic disk consists of an ID area (ID) and a data area (DT). For convenience's sake, sequential numbers are allocated to the ID areas and the data areas such that an index mark provided as a reference point in the track is followed by numbers ID0, ID1, . . . , DT0, DT1, . . . . Synchronization codes (SB) are provided at the head of the ID area and the data area.

Thus, the ID area numbered ID0 corresponds to the first data block (data area DT0) of the track. Here, an address comprising a cylinder number, a head number and a sector number is written. Writing and reading in the data area DT0 is conducted after the ID area ID0 is accessed and the address therein is referenced. The ID area ID1 is an ID area for the next data block.

The servo information is written on a track at equidistant intervals. For example, servo information is written in a servo frame obtained by dividing the circumference into 40 or 60 areas. The servo information contains information for controlling the magnetic disk to be rotated at a precisely controlled cycle, and information necessary for a seek operation of the head. In some cases, the servo information may include a cylinder number.

Since the servo information is written on a track at equidistant intervals, a data area may be divided as indicated by data areas DT0, DT1, . . . in FIG. 1. The way data areas are divided may differ from one sector to another. For example, the Japanese Laid-Open Patent Application No. 2-71458 discloses a scheme whereby servo termination information for canceling a write inhibit signal is recorded at the end of the servo information so that the servo information is not mistaken for the data area and erased.

As described above, immediately before writing is performed in the data area, the address in the ID area is read so that writing is conducted in a data block of a proper sector.

It is possible to know the position of the sector accessed by performing a seeking operation of the head or by generating a sector pulse. However, these schemes do not have satisfactory reliability. The seek operation makes it possible to accurately know the position of the first cylinder 0 (track 00) using the guard band zone. Regarding the other tracks, the sought cylinder address is known by counting track crossing pulses generated when the head crosses from one track to another.

There may be missing track crossing pulses during the seek operation. Conversely, excessive track crossing pulses may be generated. Thus, there may be cases where the cylinder reached in the seek operation is different from the target cylinder.

There are similar problems with sector pulses. That is, servo mark signals may be missing or excessively generated. Since the seek control and the sector pulse generation are conducted by reading information recorded on the magnetic disk, missing or excessive track crossing pulses or servo mark signals occur as a result of a failure to read recorded patterns on the magnetic disk or a failure in detecting the information correctly.

Further, the head does not return a feedback signal that allows confirmation that the proper head has been selected.

Thus, providing an ID area ensures that the cylinder identifier, the head identifier and the sector address can be confirmed. In this way, it is possible to prevent writing and reading of data in a sector which is not a target area.

An arrangement wherein the ID area is omitted to meet a demand for an increased storage capacity does not serve the purpose because the information including the head identifier and the sector address that is conventionally recorded in the ID area has to be incorporated in the servo information, resulting in only a reallocation of the information. In this arrangement, in order to improve reliability, redundancy codes such as cyclic redundancy check (CRC) codes should be added to the servo information in which the address information is arranged. Otherwise, some information may be recorded multiple times. Thus, there is a problem in that the size of the servo information itself becomes large.

Further, incorporating the head information in the servo information means that different servo information should be recorded on different magnetic disk surfaces associated with respective heads. Thus, the recording of the servo information becomes complex.

SUMMARY OF THE INVENTION

Accordingly, an object of the present invention is to provide a read/write apparatus and an address recognizing method in the apparatus wherein the aforementioned problems are eliminated.

Another and more specific object of the present invention is to provide a read/write apparatus and an address recognizing method wherein high reliability and the omission of the ID area are realized at the same time, and the storage capacity is increased.

In accordance with the present invention, a sector address recognition means recognizes a sector address in a magnetic disk where individual areas for storing sector address information and head identifier information are omitted by generating a sector pulse when a predetermined count is reached after a detection of a servo mark and when an interval between adjacent servo marks included in servo information that also includes cylinder address information is a preset interval. The head identifier recognition means recognizes a head identifier on the basis of how the servo information or the head identifier information is recorded. In this way, the sector address, the head identifier and the cylinder address are recognized even if the above-mentioned individual areas are omitted. Since the sector address recognition means performs recognition by generating a sector pulse when a preset servo mark interval is detected, erroneous generation of a sector pulse due to excessive or missing servo marks is avoided. Thus, it is possible to attain a high reliability and increase the storage capacity.

In further accordance with the present invention, generation of a sector pulse is inhibited and writing of information to a target sector is inhibited when the monitored interval between adjacent servo marks is not a preset interval. In this way, erroneous generation of a sector pulse due to excessive or missing servo marks is avoided and a high reliability is attained.

In further accordance with the present invention, head identifier recognition means recognizes the head identifier either on the basis of the positions at which the servo information is read and the time required for switching of heads, the servo information being recorded at mutually unevenly displaced positions in different recording surfaces of the recording mediums, or by referring to a table that specifies differences between a frame number read by a head and a frame number read by another head switched into use, the frame number being contained in the servo information. In this way, it is easy to recognize the head identifier. Individual areas for storing head identifier information can be omitted and storage capacity can be increased, while a high reliability is maintained.

In further accordance with the present invention, the head identifier information is recorded in and read from predetermined areas on the recording surfaces of the recording mediums. In this way, omission of individual areas provided in each data area to store the head identifier information is attained, and the head identifier can be recognized easily.

In further accordance with the present invention, the head identifier, a combination of the head identifier and the sector address, or a combination of the head identifier, the sector address and a part of the cylinder address is contained in synchronization information recorded in synchronization information areas provided in the recording mediums in which individual areas for storing the head identifier information and the sector address information are omitted. The head identifier, the sector address and the cylinder address are recognized by reading the synchronization information. In this way, omission of the individual areas for storing the head identifier information and the like is attained and the storage capacity is increased, while a high reliability is maintained.

BRIEF DESCRIPTION OF THE DRAWINGS

Other objects and further features of the present invention will be apparent from the following detailed description when read in conjunction with the accompanying drawings, in which:

FIG. 10 shows a table according to the scheme shown in FIG. 9, specifying a time required for switching of heads;

FIG. 12 shows a table according to the scheme shown in FIG. 11, specifying a time required for switching of heads;

FIGS. 16A and 16B show a construction according to a second embodiment of the present invention, for recognizing the address;

FIGS. 17A and 17B show a construction of a first variation of the second embodiment shown in FIGS. 16A and 16B.

DESCRIPTION OF THE PREFERRED EMBODIMENTS

Figure 1:
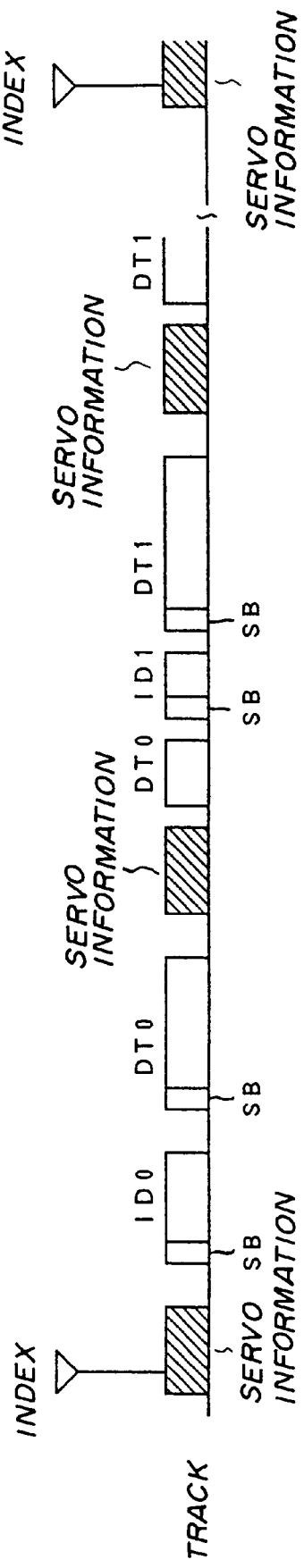
FIG. 1 explains a disk format according to the conventional data surface servo method.
Figure 2:
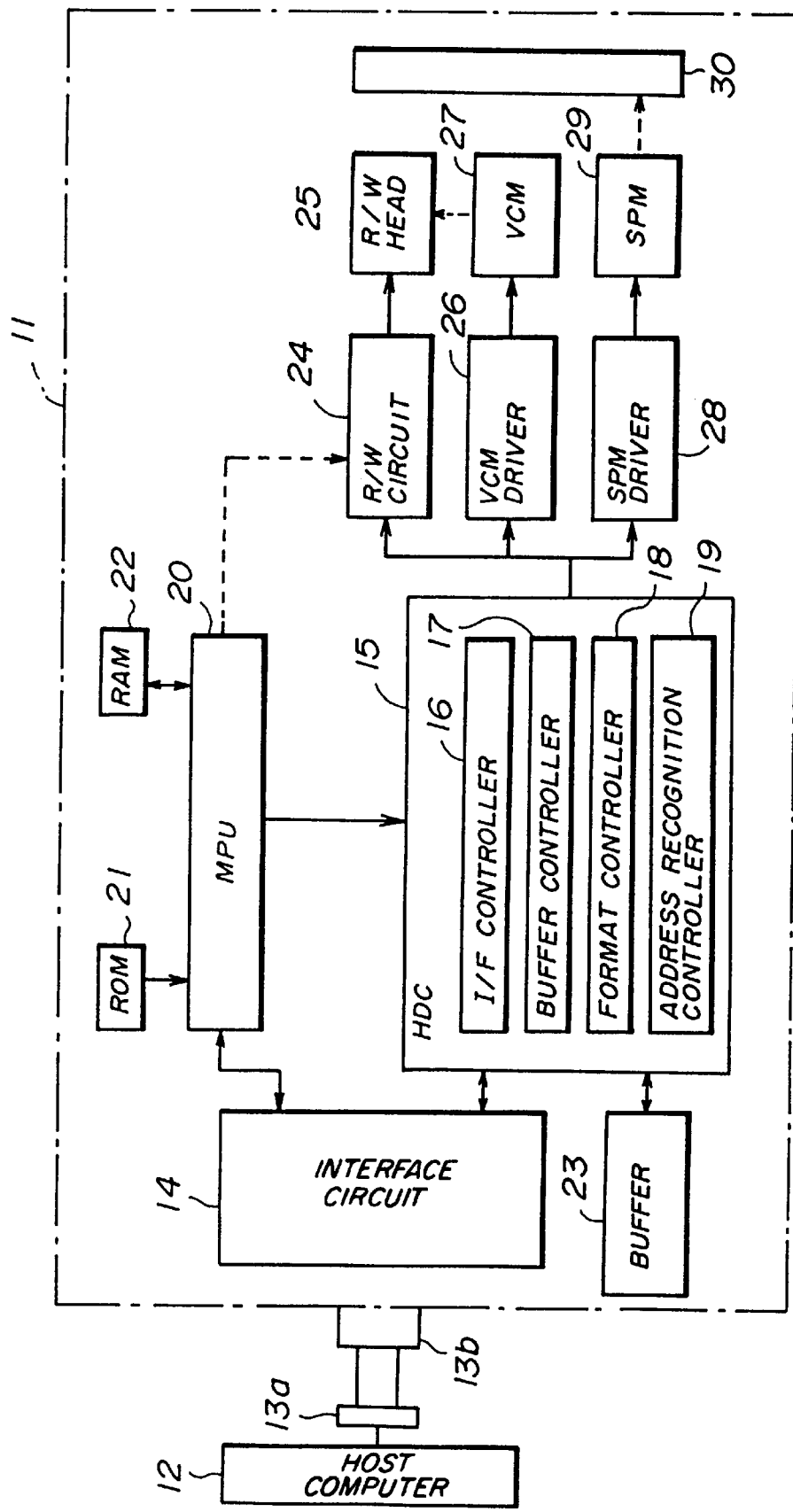
FIG. 2 is a block diagram of a first embodiment of the present invention.

FIG. 2 is a block diagram of a first embodiment of the present invention. Specifically, FIG. 2 is a block diagram showing a magnetic disk drive 11 as a read/write apparatus. The magnetic disk drive 11 is connected to a host computer 12 via interface devices (SCSI devices) 13a and 13b.

The magnetic disk drive 11 has an interface circuit 14 and a hard disk controller (HDC) 15 which are connected to each other. User data is input to the HDC 15 from the host computer 12 via the interface circuit 14.

The HDC 15 is at least equipped with an I/F controller 16, a buffer controller 17, a format controller 18, an address recognition controller 19 (described with reference to FIGS. 4 and 5).

The interface circuit 14 is connected to a MPU 20. The MPU 20 is provided with a read only memory (ROM) 21 and a random access memory (RAM) 22. Various instructions including a read instruction and a write instruction are input to the MPU 20 from the host computer 12 via the interface circuit 14.

The HDC 15 is provided with a buffer 23 which temporarily stores the user data input to the HDC 15 and outputs the same in a writing operation. The HDC 15 supplies data to a predetermined number of read/write heads (R/W heads) 25 via a read/write circuit (R/W circuit) 24. The R/W circuit 24 is equipped with a demodulating circuit (not shown), a modulating circuit (not shown), an A/D conversion circuit (not shown) and a D/A conversion circuit (not shown). The MPU 20 supplies a write gate signal and a read gate signal to the HDC 15.

The HDC 15 drives a voice coil motor (VCM) 27 via a VCM driver 26. The VCM 27 initiates a seek operation by driving the R/W heads 25 in a radial direction of a magnetic disk described later.

Figure 8:
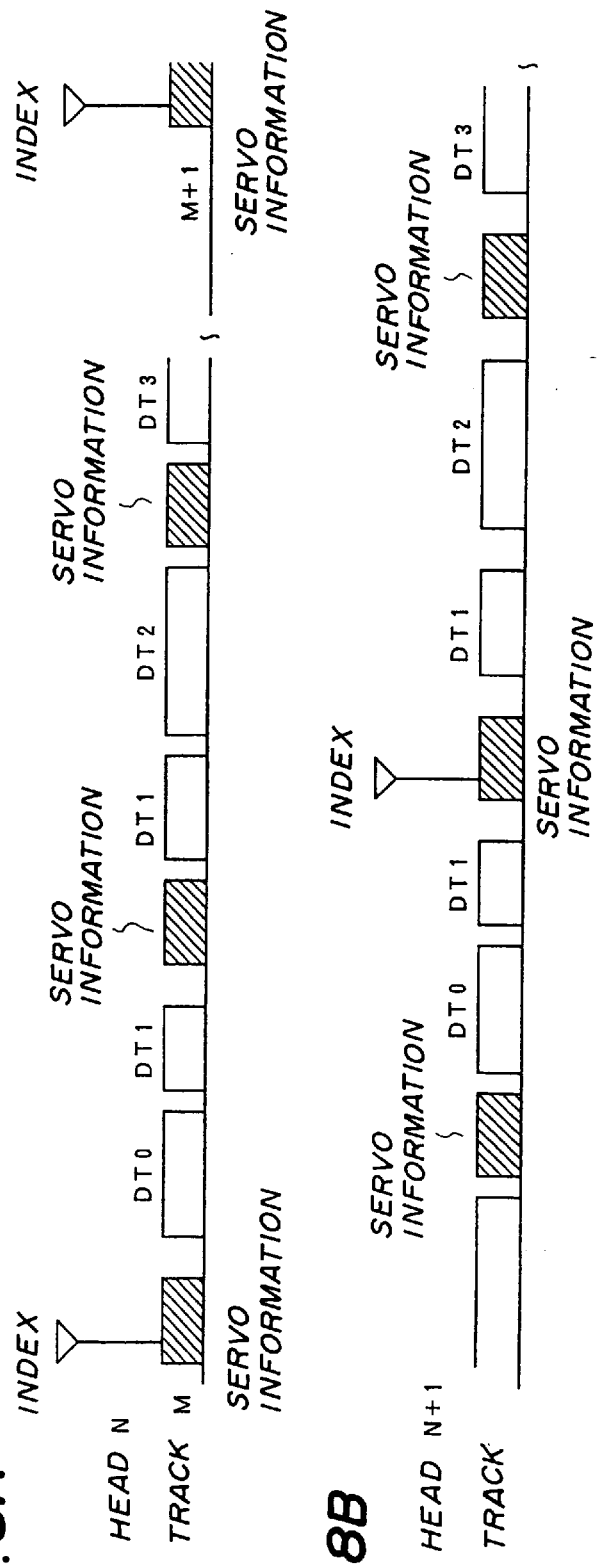
FIGS. 8A and 8B explain how a head identifier is recognized by switching of heads.

The HDC 15 drives a spindle motor (SPM) 29 via a SPM driver 28. The SPM 29 rotates a predetermined number of magnetic disks (recording medium) 30 at a constant speed. The magnetic disk 30 are formatted such that at least the ID areas for storing the sector address information and the head identifier information are omitted (description of the format will be given with reference to FIGS. 6 and 8). Each recording surface is provided with the corresponding R/W head 25.

Figure 3A:
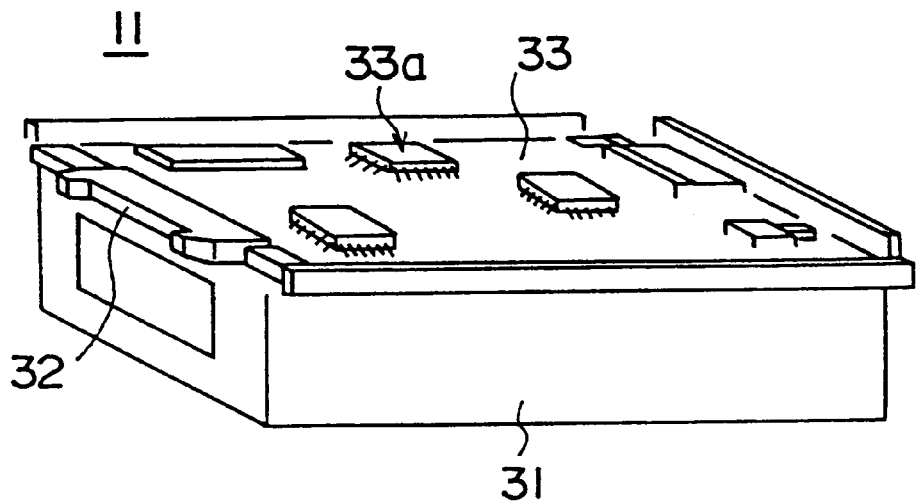
FIG. 3A is a schematic view showing the bottom of a magnetic disk drive to which the present invention is applied.
Figure 3B:
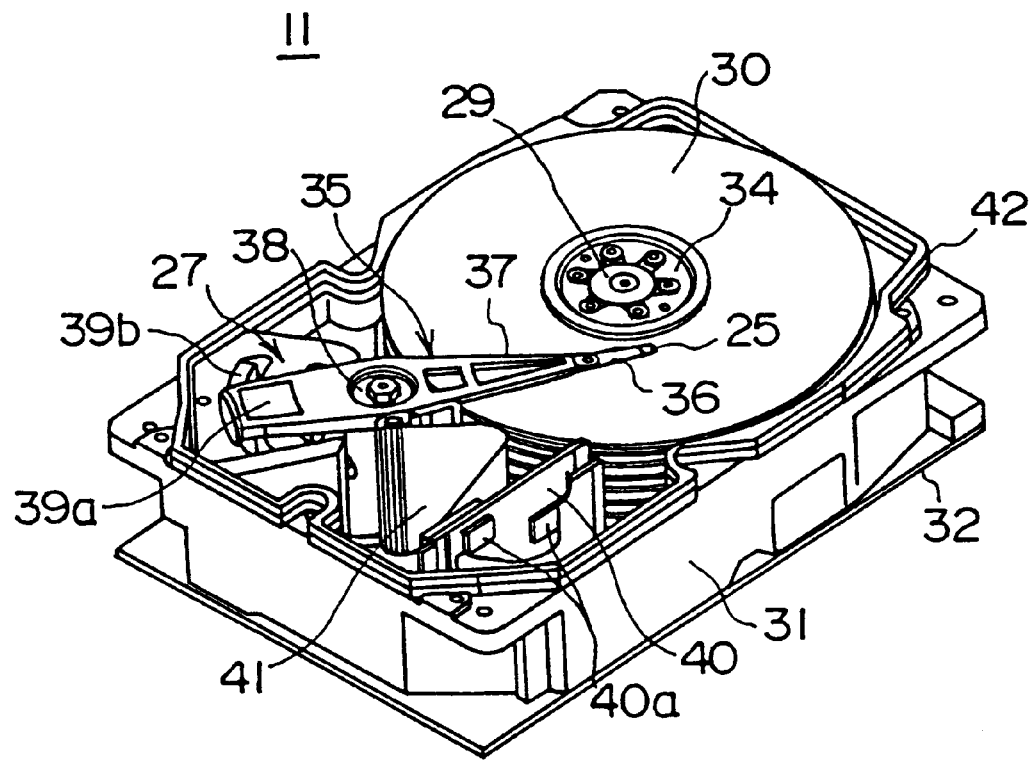
FIG. 3B is a perspective view showing the interior of the magnetic disk drive of FIG. 3A.

FIGS. 3A and 3B show the construction of a magnetic disk drive to which the present invention is applied, FIG. 3A being a schematic view showing the bottom of a magnetic disk drive and FIG. 3B being a perspective view showing the interior of the magnetic disk drive of FIG. 3A. Referring to FIG. 3A, a magnetic disk drive 11 has an enclosure 31 and a base 32 which constitutes the bottom of the enclosure 31. A printed circuit board 33 is disposed on the base 32. Elements 33a formed of LSIs etc. and incorporating the control system (the HDC 15, the MPU 12 and the like) shown in FIG. 2 are mounted on the printed circuit board 33.

Referring to FIG. 3B, in the enclosure 31 fitted on the base 32, the magnetic disk 30 is rotatably fitted to the spindle motor (SPM) 29 having a spindle mechanism 34.

Referring further to FIG. 3B, an actuator 35 is constituted such that a plurality of arms 37 are fixed to a rotation shaft 38. Each of the arms 37 is fitted with a support spring mechanism 36 having the R/W head 25 mounted thereon. The voice coil motor (VCM) 27 constituted of a voice coil 39a and a magnet 39b is provided opposite to the R/W head 25 across the length of the arm 37 including the rotation shaft 38.

A printed circuit board 40 on which a head IC 40a and the like are mounted is connected to the printed circuit board 33 via a flexible printed circuit board (FPC) 41.

A cover (not shown) is fitted on the enclosure 31 via a seal member 42.

Figure 4:
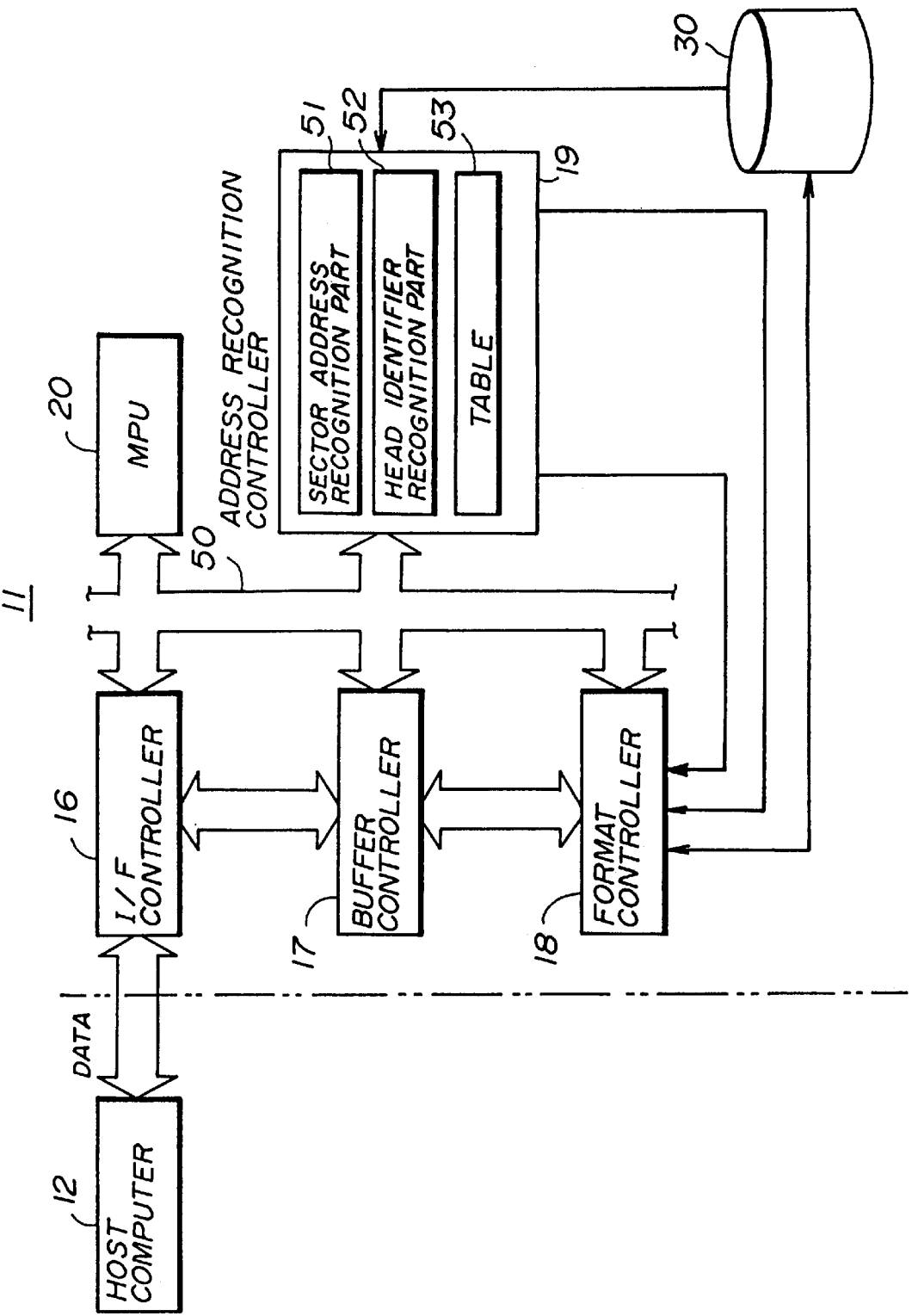
FIG. 4 is a functional block diagram showing the control scheme of the present invention which does not use ID areas.

FIG. 4 is a functional block diagram showing the control scheme of the present invention which does not use ID areas. Referring to FIG. 4, the I/F controller 16, the buffer controller 17, the format controller 18, the MPU 20 and the address recognition controller 19 are connected to each other via a bus 50. The address recognition controller 19 comprises a sector address recognition part (sector address recognition means) 51, a head identifier recognition part (head identifier recognition means) 52 and a predetermined number of tables 53. Data from the host computer 12 is exchanged between the I/F controller 16, the buffer controller 17 and the format controller 18.

The I/F controller 16 exchanges data with the host computer 12 in accordance with the protocol of the interface. The buffer controller 17 retains data in the buffer 23 and adjusts the operating timing with respect to the format controller 18. The format controller 18 writes data to and reads data from the magnetic disk 30. The MPU 20 controls the whole circuit.

The sector address recognition part 51 of the address recognition controller 19 detects an interval between adjacent servo marks (described later) recorded on the magnetic disk 30, and also monitors the interval thus detected. On the condition that the interval between the servo marks is a preset interval, the address recognition part 51 generates a sector pulse when a predetermined time indicated by a predetermined number of counts has passed after a detection of a servo mark, so as to recognize the sector address of the target R/W head 25 (the sector address recognition will be described in detail with reference to FIGS. 5–7).

The head identifier recognition part 52 recognizes the identification of the target R/W head 25 from the recording state of the servo information or the head identity information (the head address detection will be described in detail with reference to FIGS. 8–14) recorded on each recording surface of the magnetic disk 30. The table 53 is provided for the purpose of recognizing the head identifier, and specifies the relationship between the R/W heads 25. The table 53 will be described with reference to FIGS. 10 and 12.

Referring to FIG. 4, the host computer 12 issues a read request or a write request to the MPU 20. In case of the read request, the host computer 12 instructs the format controller 18 to read data recorded in a predetermined sector of the magnetic disk 30. The host computer 12 then instructs the data thus read to be temporarily stored in the buffer 23, which is controlled by the buffer controller 17. The I/F controller 16 controls the data to be sent to the host computer 12.

In case of the write request, the host computer 12 instructs the buffer controller 17 to store write data temporarily via the I/F controller 16. The format controller 18 controls the data to be written to a predetermined sector of the magnetic disk 30. In this way, the conventional reading operation and writing operation are carried out.

In the reading and writing operations, the sector address recognition part 51 recognizes the sector address on the basis of the servo mark, and the head identifier recognition part 52 recognizes the head identifier on the basis of the servo information or the like.

Figure 5:
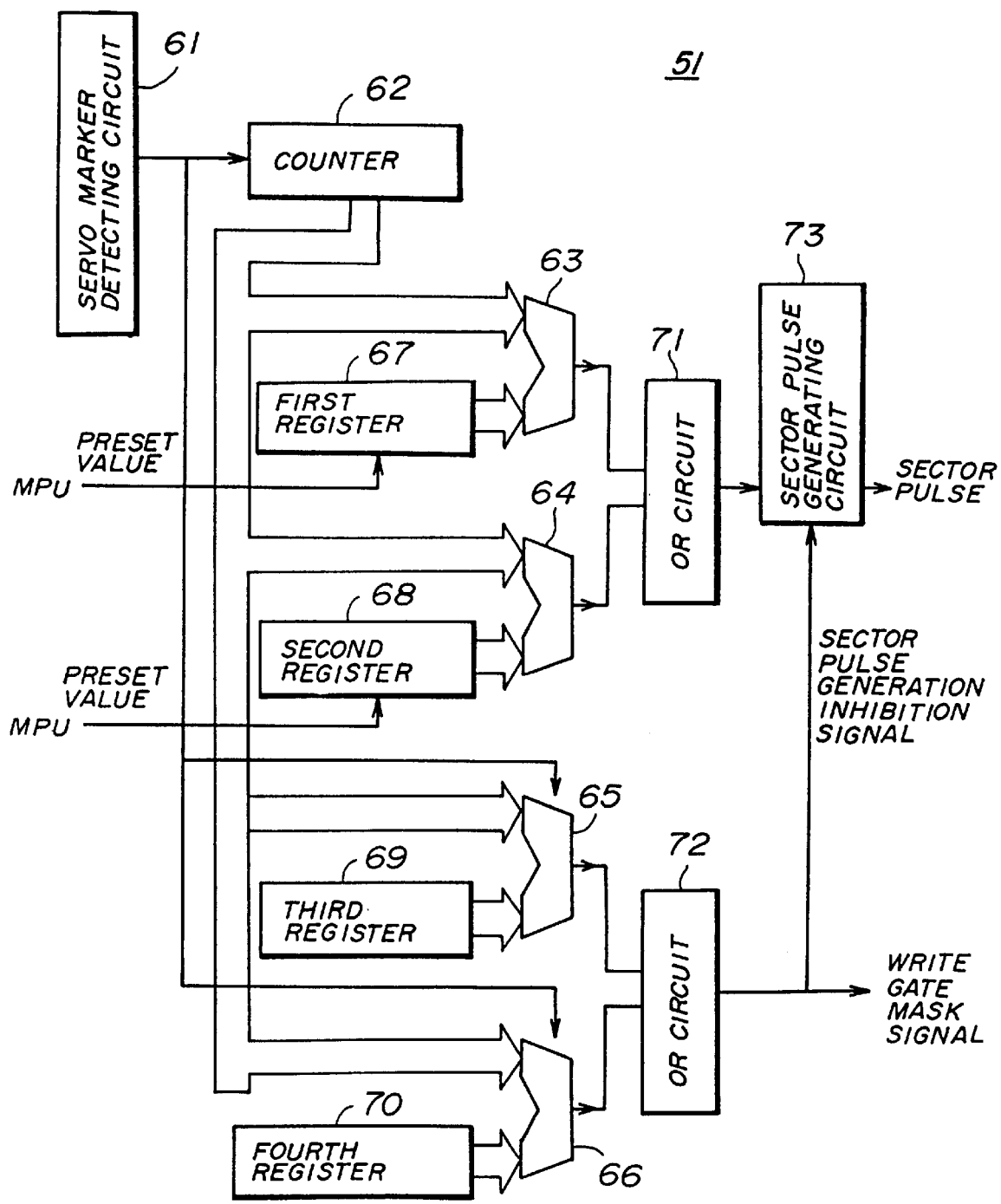
FIG. 5 is a block diagram of a sector address recognition part provided in an address recognition controller of FIG. 4.

FIG. 5 is a block diagram of the sector address recognition part 51 provided in the address recognition controller 19 of FIG. 4. In the sector address recognition part 51 shown in FIG. 5, a servo mark detecting circuit 61 detects servo marks. Signals indicating detection are input to and counted by a counter (counting means) 62. The count of the counter 62 is input to one of the two input terminals of first through fourth comparing circuits 63–66. The first and second comparing circuits 63 and 64 are real-time comparing circuits, whereas the third and fourth comparing circuits 65 and 66 perform a comparison at a timing at which the servo mark is detected. Therefore, the signal indicating the detection of the servo mark is input to the third and fourth comparing circuits 65 and 66 from the servo mark detecting circuit 61.

Output values of the first and second registers 67 and 68 are input to the other input terminal of the first and second comparing circuits 63 and 64, respectively. Output values of the third and fourth registers 69 and 70 are input to the other input terminal of the third and fourth comparing circuits 65 and 66.

The first and second registers 67 and 68 output a value indicating a timing at which the sector pulse is generated. The third register 69 outputs a value indicating a minimum servo mark wait time. The fourth register 70 outputs a value indicating a maximum servo mark wait time.

Preset values of the first and second registers 67 and 68 are supplied by the MPU 20 and rewritten for each sector. It is to be noted that the magnetic disk 30 rotated by the SPM 29 undergoes a certain variation in the rotation speed. The preset values for the third and fourth registers 69 and 70 are set in an anticipation of the above-mentioned variation so that the servo mark interval is detected and monitored within a certain latitude.

Comparison results of the first and second comparing circuits 63 and 64 are input to an OR circuit 71, and comparison results of the third and fourth comparing circuits 65 and 66 yielded at a timing at which the servo mark is detected are input to an OR circuit 72. An output signal from the OR circuit 71 is input to a sector pulse generating circuit 73 as a generation timing, whereupon the sector pulse generating circuit 73 outputs a sector pulse. An output signal from the OR circuit 72 is output to the sector pulse generating circuit 73 as a sector pulse generating inhibition signal. The same output signal from the OR circuit 72 is output to the format controller 18 as a write gate mask signal.

The first and second comparing circuits 63 and 64, the first and second registers 67 and 68, the OR circuit 71, and the sector pulse generating circuit 73 constitute a sector pulse generating part. The third and fourth comparing circuits 65 and 66, the third and fourth registers 69 and 70, and the OR circuit 72 constitute a monitoring part.

Figure 6:
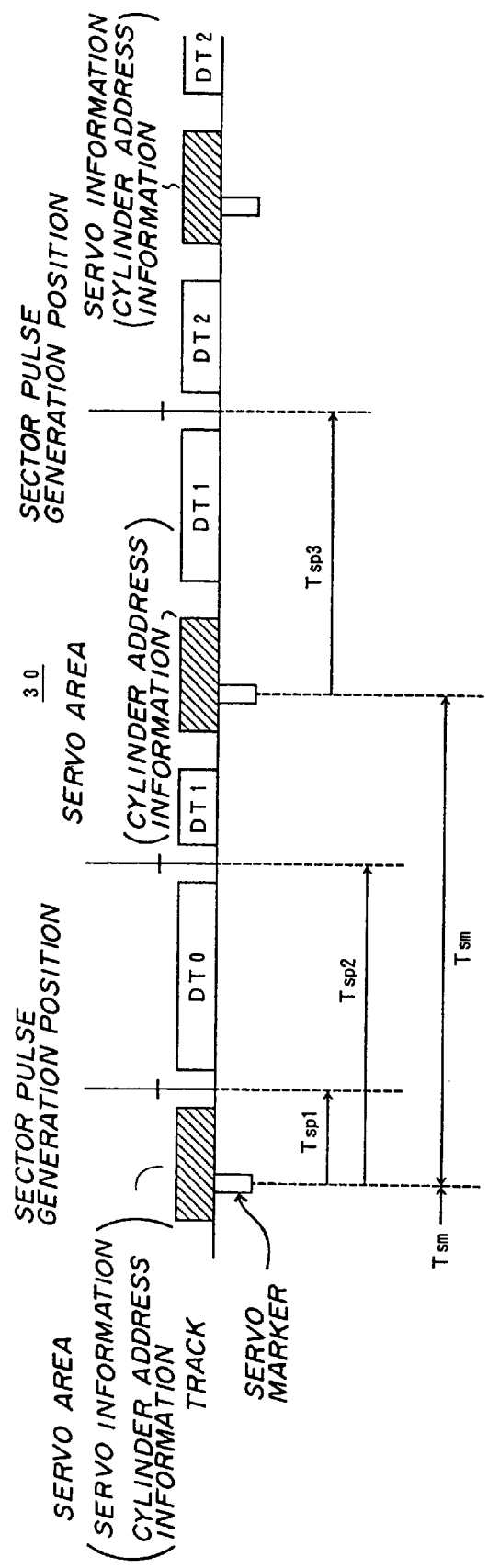
FIG. 6 explains how sector addresses on a track are recognized.

FIG. 6 explains how sector addresses on a track are recognized. Each of the tracks on the recording surface of the magnetic disk 30 is provided with a series of data areas DT0, DT1, . . . for reading/writing purposes. A predetermined number of servo areas in which servo information is recorded are disposed on the track. The servo information is a code necessary to rotate the magnetic disk 30 at a precisely controlled cycle and to perform a seek operation of the R/W heads 25. The servo information also includes cylinder address information and servo mark information. As shown in FIG. 6, conventional ID areas containing information relating to reading and writing operations are omitted from the track.

Figure 7:
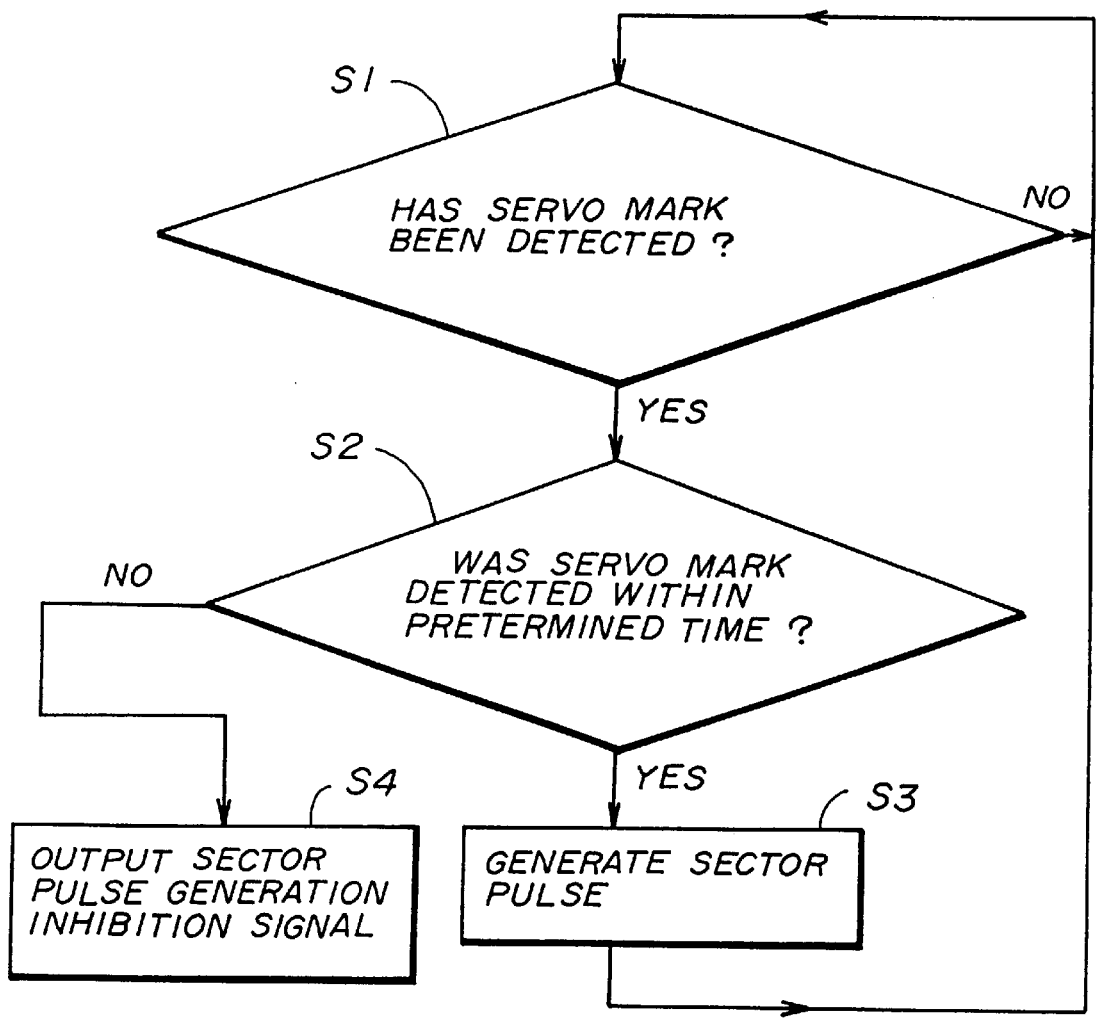
FIG. 7 is a flowchart showing the operation for recognizing sector addresses.

FIG. 7 is a flowchart showing the operation of recognizing sector addresses. FIGS. 5 and 6 are also referred to in the following description. A determination is made in step S1 as to whether or not the servo mark detecting circuit 61 has detected a servo mark. When a servo mark has been detected, a signal indicating the detection is fed to the counter 62 and the third and fourth comparing circuits 65 and 66. The counter 62 starts a count in response to the servo mark detection signal. The count of the counter 62 is sequentially fed to the first through fourth comparing circuits 63 through 66.

The third comparing circuit 65 compares the maximum servo mark wait time output by the third register 69 with the count immediately before the count is reset when the next servo mark detection signal is asserted, the comparison being done at a timing of the assertion. The fourth comparing circuit 66 compares the minimum servo mark wait time output by the fourth register 70 with the count immediately before the count is reset when the next servo mark detection signal is asserted, the comparison being done at a timing of the assertion.

If the count is greater than the minimum servo mark wait time output by the third register 69 and smaller than the maximum servo mark wait time output by the fourth register 70, it is found that the servo mark is normally detected and the interval between the servo marks is generally regular. Therefore, generation of a sector pulse is permitted. To summarize, a determination is made in step S2 as to whether or not the servo mark was detected in an allowable time frame, using the third and fourth comparing circuits 65 and 66, and the third and fourth registers 69 and 70. If the servo mark was detected in an allowable time frame, a sector pulse generation inhibition signal (write gate mask signal) from the OR circuit 72 is negated.

If the count started when a servo mark detection signal is output is found to agree with the value output by the first and second registers 67 and 68, using the first and second comparing circuits 63 and 64, the OR circuit 71 outputs a signal activating the sector pulse generating circuit 73. Thereupon, the sector pulse generating circuit 73 generates a sector pulse and outputs the same in step S3. That is, as shown in FIG. 6, when a servo mark interval $T_{sm}$ preceding the data area DT0 is normal, a sector pulse is generated when a time $T_{SP1}$ has elapsed after the detection of the servo mark. That is, the sector pulse is generated immediately before the data area DT0. For example, the time $T_{SP1}$ is set in the first register 67. Further, a sector pulse is generated when a time $T_{SP2}$ has elapsed after the detection of the servo mark. That is, the sector pulse is generated immediately before the data area DT1. For example, the time $TSP_2$ is set in the second register 68.

Since the sector pulses should be generated immediately before the data areas DT0, DT1, . . . , the MPU 20 makes the value set in the first and second registers 67 and 68 to vary sector to sector depending on the position of the data areas. Accordingly, when the subsequent servo mark interval is normal, a sector pulse is generated when a time $T_{SP3}$ has elapsed after the next detection of the servo mark. That is, the sector pulse is generated immediately before the data area DT2. Generation of a plurality of sector pulses between the servo marks may be necessary depending on the storage capacity of the data areas. In this case, the number of comparing circuits and registers may be set appropriately.

When excessive or missing servo marks occur, the interval between servo marks changes. These changes are detected by the third and fourth comparing circuits 65 and 66, and the third and fourth registers 69 and 70. The sector pulse generation inhibition signal output from the OR circuit 72 is asserted in step S4 so that generation of a sector pulse by the sector pulse generating circuit 73 is inhibited.

That is, even when the sector pulse generating circuit 73 is activated by the output signals from the first and second comparing circuits 63 and 64, generation of a sector pulse is inhibited by the sector pulse generation inhibition signal being asserted. The write gate mask signal is asserted in the format controller 18 so that the writing operation in the corresponding sector is inhibited.

By generating a sector pulse immediately before each data area, it is possible to recognize the address of the target sector. That is, the sector address and the cylinder address specified by the cylinder address information contained in the servo information are recognized. Also, the head identifier is recognized. Thus, even if the ID area is omitted, it is possible to perform accurate data reading and writing.

Generation of a sector pulse on the basis of the servo information is known, for example, in Japanese Laid-Open Patent Application No. 5-225731. The Japanese Laid-Open Patent Application No. 5-225731 discloses a scheme whereby the clock is counted in response to the servo information (servo mark) so that a sector pulse is generated when a predetermined number of clocks have been counted. However, it should be noted that the present invention discloses an arrangement in which the interval between servo marks is monitored, and a sector pulse is generated when the interval is normal. It will be noted that Japanese Laid-Open Patent Application No. 5-225731 has a problem in that a sector pulse is generated even when excessive or missing servo marks occur, causing a writing operation to be carried out and data and servo information to be erased.

Figure 9:
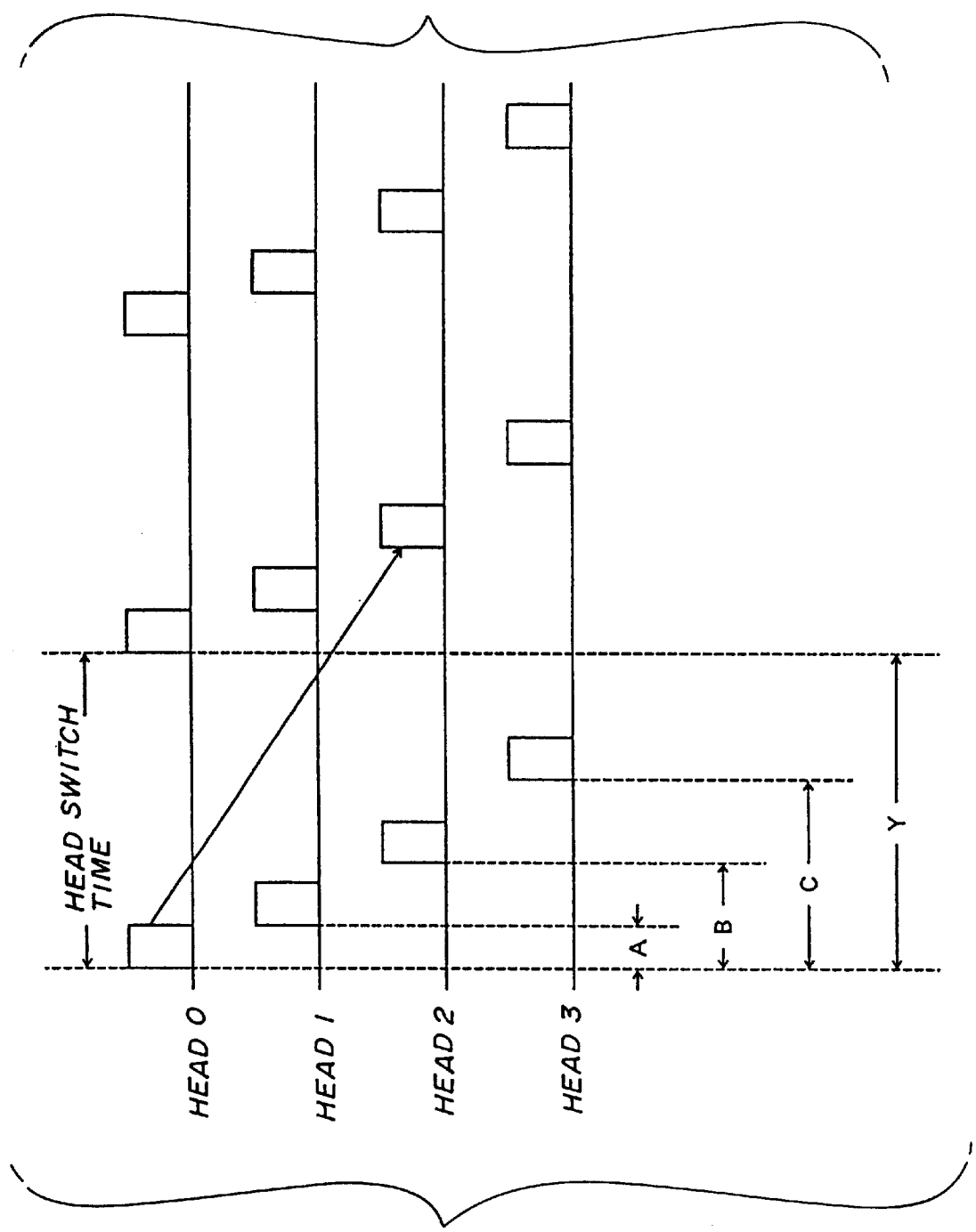
FIG. 9 explains how the head identifier is recognized by switching of heads when there is no frame number provided.
Figure 11:
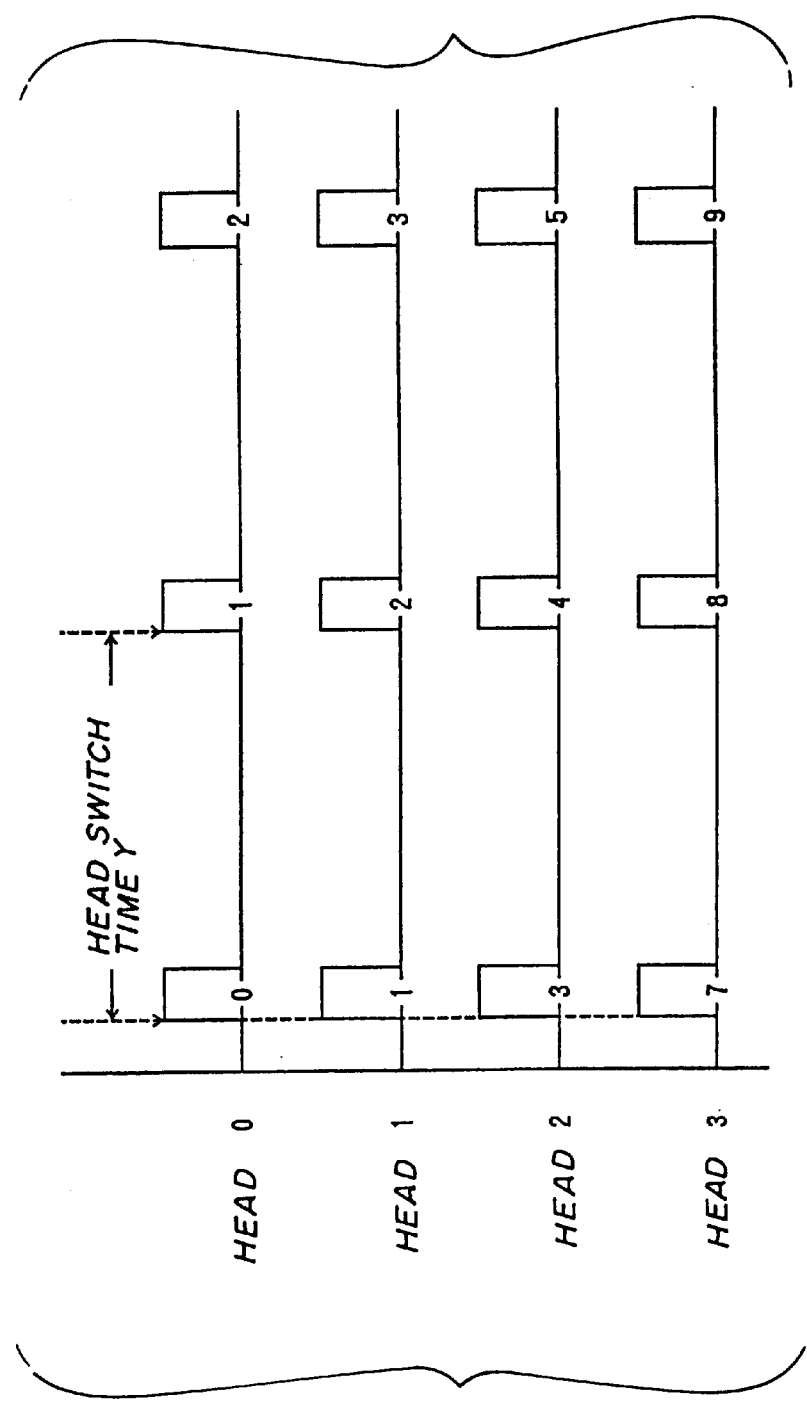
FIG. 11 explains how the head identifier is recognized using switching of heads according to a first example of the first embodiment, wherein the servo information has a frame number.

FIGS. 8A and 8B explain how the head identifier is recognized by switching of heads. The head identifier may be recognized when the head is switched. Alternatively, the head identifier may be recognized without switching of the heads. FIGS. 8A and 8B explain the head identifier recognition by switching of heads. The head identifier recognition by switching of heads may either use a frame (servo frame) number added to the servo information or may not use the same. FIGS. 9 and 10 shows a case where the frame number is not added. FIGS. 11 and 12 shows a case where the frame number is added.

Referring to FIGS. 8A and 8B, the servo information is recorded on different positions on the track depending on the recording surface of the magnetic disk 30 associated with the respective R/W head 25. It is ensured that the servo information is recorded at equal intervals on the track of a recording surface. A predetermined block of servo information contains index information. Different arrangements of servo information on different recording surfaces are illustrated in FIGS. 8A and 8B. FIG. 8A shows positions at which the servo information is recorded on the track of a recording surface associated with the R/W head N, and FIG. 8B shows positions at which the servo information is recorded on the track of a recording surface associated with the R/W head N+1. As has been described before, the servo information includes a servo mark, cylinder address information and index information.

While FIGS. 8A and 8B show recording surfaces of two R/W heads N and N+1, all servo information is recorded in different positions in different recording surfaces associated with the respective R/W heads 25. Displacement of the positions is set to an uneven value, that is, to a value that differs from one recording surface to another.

While the position of the servo information is made to differ using a direct means according to this embodiment, an alternative approach is to allow the body of servo information itself to have the same positions and the servo information containing the index information to have different positions in different recording surfaces.

FIG. 9 explains how the head identifier is recognized by switching of heads when there is no frame number provided.

FIG. 10 shows the relationship between a R/W head active before switching and a R/W head active after switching. The relationship comprises means for specifying a time required for switching of the heads according to the scheme shown in FIG. 9. Since the servo information is recorded in mutually unevenly displaced positions in different recording surfaces associated with the respective R/W heads 25, the time required for one R/W head 25 selected in a head switching operation to read the servo information differs from the time required for another R/W head 25.

Thus, the time required for switching of the R/W heads 25 is determined by the positions at which the servo information is recorded. The table 53 shown in FIG. 10 specifies values indicating the time required for switching of heads. For example, referring to FIG. 10, the time required for switching between heads 0–3 (R/W heads 25) is indicated by a value represented in units of 1/16 of a frame.

To be more precise, the time required for switching of heads is set to correspond to about two frames on the recording surface of the target head. Assuming that the time required for the head to pass one frame (head switch time) is Y (see FIG. 9), the number of heads is Z, and the address of the head is n, it is possible to set the time required for switching of heads to be different for all combinations of heads, by displacing positions of servo information on the recording surfaces by $Y \times 2^{-Z} \times (2^n - 1)$ times the frame.

As shown in FIG. 9, with the head 0 being used as a reference, the time A required for switching to the head 1 is Y/16, the time B required for switching to the head 2 is (Y/16)×3, and the time C required for switching to the head 3 is (Y/16)×7.

It takes a time associated with a sum of one frame (16/16) and a fraction of a frame (1/16, 3/16, . . . ) for switching between heads. The time required for different cases of head-switching is specified in FIG. 10. Thus, when the table 53 is referred to for recognizing the head identifier, the head identifier recognition part 52 equipped with counting means measures a time between a moment at which switching of heads takes place and a moment at which the selected head reads servo information.

As shown in FIG. 9, recognition of the head identifier is carried out in the following manner. When it is found that a time corresponding to (19/16) of a frame elapsed from a moment at which the head 0 is switched to another head to a moment at which the other head reads servo information, it is determined by referring to the table 53 that the other head that read the servo information is the head 2. Switching between other combinations of heads is used likewise for recognition of other head identities.

If the head address obtained by referring to the table 53 shown in FIG. 10 is not the expected head identifier, that is, the identifier of the selected head, the head switching operation is repeated until the reference value of the selected head is obtained.

As has been described, by obtaining the cylinder address from the servo information, by obtaining the sector address using the sector address recognition part 51, and by obtaining the head identifier using the head identifier recognition part 52, the address recognition can be performed with high reliability even if the ID area is omitted. Since the sector identifier information and the head address information otherwise recorded in the ID area are not transferred to another separate area according to the abovedescribed arrangement, it is possible to increase the storage capacity of the magnetic disk 30.

FIG. 11 explains how the head identifier is recognized by switching of heads according to a first example of the first embodiment, wherein the servo information has a frame number. FIG. 12 shows a table according to the scheme shown in FIG. 11 showing the relationship between a R/W head active before switching and a R/W head active after switching. The relationship shown comprises means for specifying a time required for switching of heads. In both FIGS. 11 and 12, switching between heads 0–3 is assumed.

As shown in FIG. 11, the positions of the servo information recorded on the tracks of the recording surfaces for respective heads are aligned. A frame number is attached to the servo information such that a frame number produces an uneven difference with respect to all the other frame numbers in alignment. The frame number is sequentially attached to the servo information with reference to index information contained in the tracks of the same recording surface. The difference in frame numbers attached to the servo information between recording surfaces is specified in the table 53 shown in FIG. 12, wherein the head represents the associated recording surface.

Assuming that the maximum unit time indicated by a difference in the frame numbers (that is, the head switch time, which is shorter than half the period of time required for the magnetic disk to make one rotation) is Y, the number of heads is Z, and the address of the head is n, the difference in the frame numbers can be made different for all the relative heads, by setting the difference in the frame numbers to $Y \times 2^{-2} \times (2^n - 1)$ between the recording surfaces.

For example, when the head 0 is switched to the head 1, the difference is 2. When the head 1 is switched to the head 3, the difference is 7. When the head 1 is switched to the head 0, the difference is 0. When the head 3 is switched to the head 1, the difference is −5.

By referring to the table 53 which specifies the differences in the frame numbers, it is possible to recognize the identity of the head selected, that is, switched into use.

Figure 13:
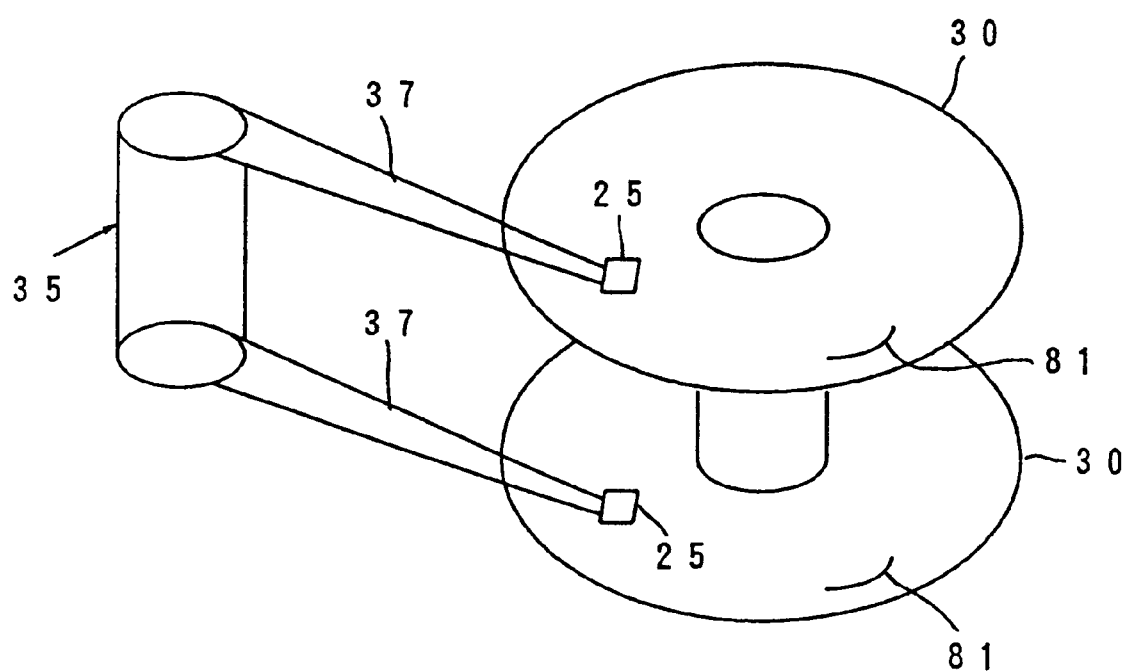
FIG. 13 shows a construction according to a second example of the first embodiment, for recognizing the head identifier without switching of heads.
Figure 14:
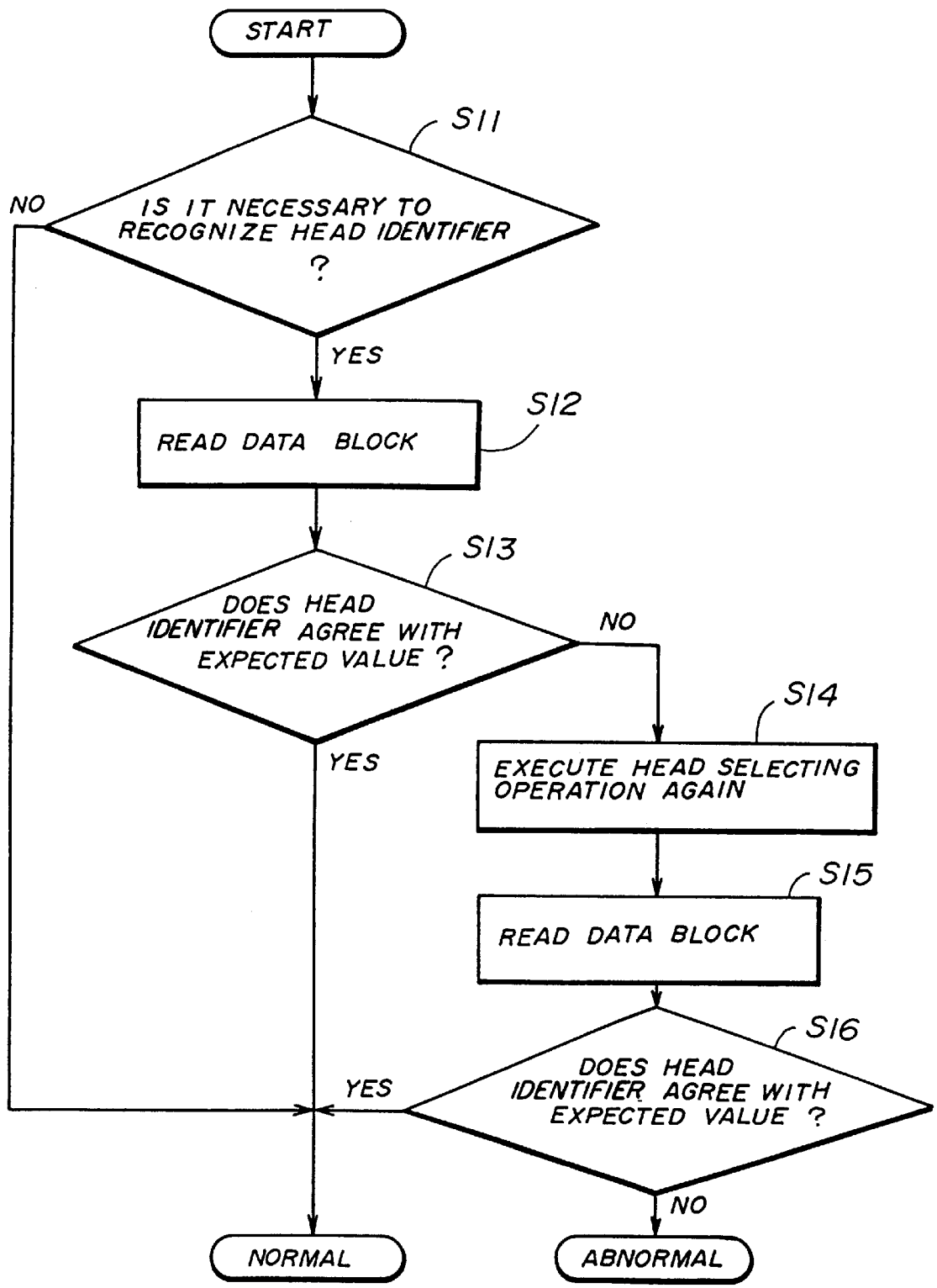
FIG. 14 is a flowchart showing the head identifier recognition operation using the construction of FIG. 13.

FIG. 13 shows a construction according to a second example of the first embodiment, for recognizing the head identifier without switching of heads. FIG. 14 is a flowchart showing the head address recognition operation using the construction of FIG. 13.

Referring to FIG. 13, the head identifier information for the R/W head 25 is written in a predetermined position in the recording surface of the magnetic disk 30, for example, in a data block 81 at the outer periphery. The data block 81 may be a block in an outer guard band area in which outer guard band information is recorded, or a block in an SA area in which SA (information relating to the analysis of the recording surface) information. In the second example of the first embodiment, the table 53 shown in FIG. 4 for recognizing the head identifier is omitted.

By reading the head identifier information in the data block 81, the identity of the associated R/W head 25 can be recognized. For example, when the reading of a block (for example, the data area in a predetermined sector) residing on a recording surface associated with a predetermined R/W head 25 is in failure, and a retry operation is initiated, there is a need to know whether or not the head identifier is correct. It is possible to obtain a correct head identifier by reading the head identifier information in the data block 81.

The head identifier recognition is carried out in the following manner. As shown in FIG. 14, a determination is made in step S11 as to whether or not it is necessary to recognize the head identifier because of a failure in reading. If it is not necessary to recognize the head identifier, the head identifier is correctly recognized. If it is necessary to recognize the head identifier, the head identifier information in the data block 81 is read in step S12. In step S13, a determination is made as to whether or not the head identifier provided by the head identifier information thus read is in agreement with an expected value (the address of the selected head). If in agreement, the head identifier is correctly recognized.

If the head identifier read in step S13 is not in agreement with the expected value, an operation for selecting the R/W head 25 is performed again in step S14. After the head selection operation is performed, the head identifier information in the data block 81 is read in step S15. A determination is then made as to whether or not the head identifier thus read is in agreement with the expected value in step S16. If in agreement, the head identifier is correctly recognized. If not in agreement, it means that an abnormal condition in which head selection is not properly performed has occurred, indicating a certain failure.

Thus, it is possible to recognize the head identifier correctly even if the ID area is omitted, by including the head identifier information in the existing data block.

Figure 15A:
FIGS. 15A and 15B show a scheme according to a third example of the first embodiment, for recognizing the head identifier without switching of heads.
Figure 15B:
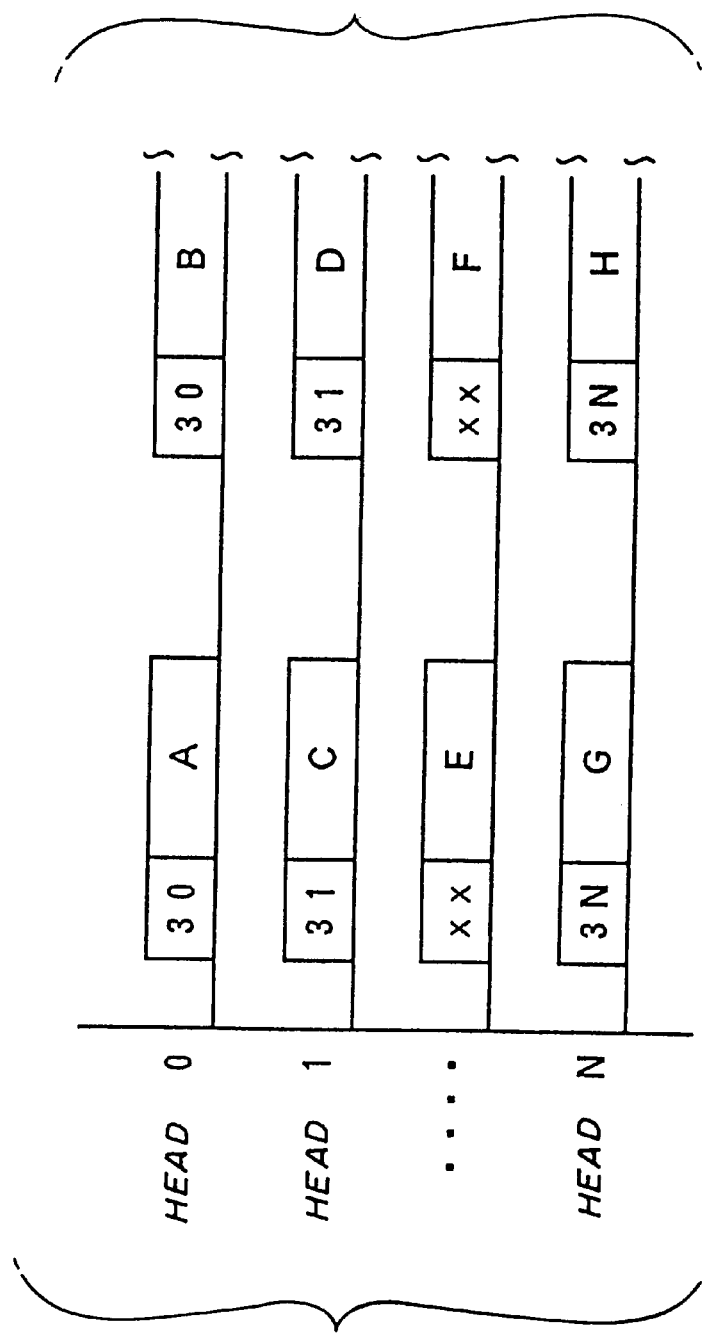

FIGS. 15A and 15B show a scheme according to a third example of the first embodiment, for recognizing the head identifier without switching of heads. Referring to FIG. 15A, the data area is preceded by an SB area (not shown in FIGS. 6, 8A and 8B) in which a synchronous byte (SB) is recorded, and an ECC area for recording an error checking code (ECC), is provided subsequent to the data area.

FIG. 15B shows how the synchronous code (synchronous byte) recorded as synchronization information in the SB area preceding the data areas A, B, . . . is made to vary depending on the recording surface of the magnetic disk 30, that is, depending on the R/W head 25 (head 0–N). For example, the synchronous code "30" is recorded for the head 0, the synchronous code "31" is recorded for the head 1, and the synchronous code "3N" is recorded for the head N.

That is, when the reading of a block in the recording surface associated with the head N is in failure, the data block in the neighborhood is read in order to know whether or not the head identifier is correctly selected. If the head is correctly selected, the reading of the data is performed normally. If not, it is determined that an synchronous code non-detection error or a correctable ECC error has occurred.

Thus, by making the synchronous code to vary depending on the recording surface, that is, depending on the associated head identifier, it is possible to correctly recognize the head identifier. In order to recognize the head address in a writing operation, the data area may be accessed before the writing operation so as to confirm that the proper synchronous code is read.

Like the second example of the first embodiment, the table 53 shown in FIG. 4 for recognizing the head identifier is omitted in the scheme shown in FIGS. 15A and 15B.

While the above description assumes a combination of the head identifier recognition means shown in FIGS. 8A through 15B with the sector address recognition means of the present invention, it is also possible to realize a high reliability even if the ID area is omitted, by combining the head identifier recognition means shown in FIGS. 8A through 15B with the conventional sector pulse generating means.

FIGS. 16A and 16B show a construction according to a second embodiment of the present invention, for recognizing the address. FIG. 16A shows tracks of the recording surface of the magnetic disk 30, wherein the data area for each sector is preceded by first and second synchronization areas SB1 and SB2 in which two-byte synchronous codes are recorded, and an ECC area is disposed subsequent to the data area. In the construction of the magnetic disk drive for reading and writing in this magnetic disk, the address recognition controller 19 is omitted.

As shown in FIG. 16B, the synchronous code recorded in the first synchronization area SB1 of the data areas (A, B, . . . ) depends on the recording surface, that is, depending on the head. For example, the synchronous code "30" is provided for the head 0, "31" for the head 1, . . . , and "3N" for the head N. The synchronous code recorded in the second synchronization area SB2 of the data areas (A, B, . . . ) depends on the position of the associated data area in a given recording surface. For example, the synchronous code "50" is provided for the first data area in a recording surface, "51" for the second data area, "52" for the third data area, "50" for the fourth data area, and the like. The servo information shown in FIG. 16A includes the cylinder address information.

Thus, it is possible to realize a high reliability of the R/W apparatus and increase the storage capacity even if the ID area is omitted, by reading the head identifier from the first synchronization area SB1, by reading the sector address from the second synchronization area SB2, and by reading the cylinder address from the servo information.

FIGS. 17A and 17B show a construction of a first variation of the second embodiment shown in FIGS. 16A and 16B. While the synchronous code in the second synchronization area SB2 varies sector to sector according to the construction shown in FIGS. 16A and 16B, at least the SB2 synchronous codes in the adjacent sector addresses differ from each other according to the construction of FIGS. 17A and 17B. For example, the SB2 synchronous code "50" is provided for the first sector address, "51" for the second sector address, "50" for the third sector address, "51" for the fourth sector address, and the like. The other aspects of the construction of FIGS. 17A and 17B are the same as those of the construction of FIGS. 16A and 16B.

That is, the construction shown in FIGS. 17A and 17B provides a scheme whereby adjacent sectors can be differentiated from each other by having different sector addresses. Recognition of the sector address is conducted accordingly.

Figure 18A:
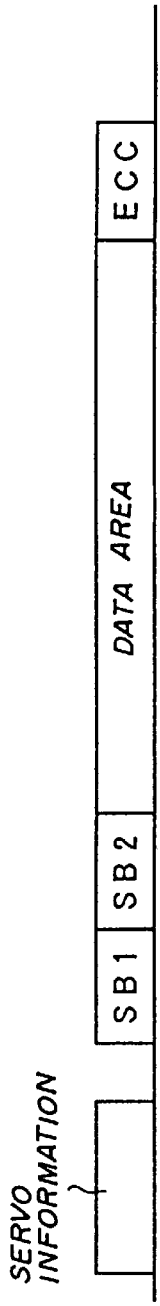
FIGS. 18A and 18B show a construction of a second variation of the second embodiment shown in FIGS. 16A and 16B.
Figure 18B:
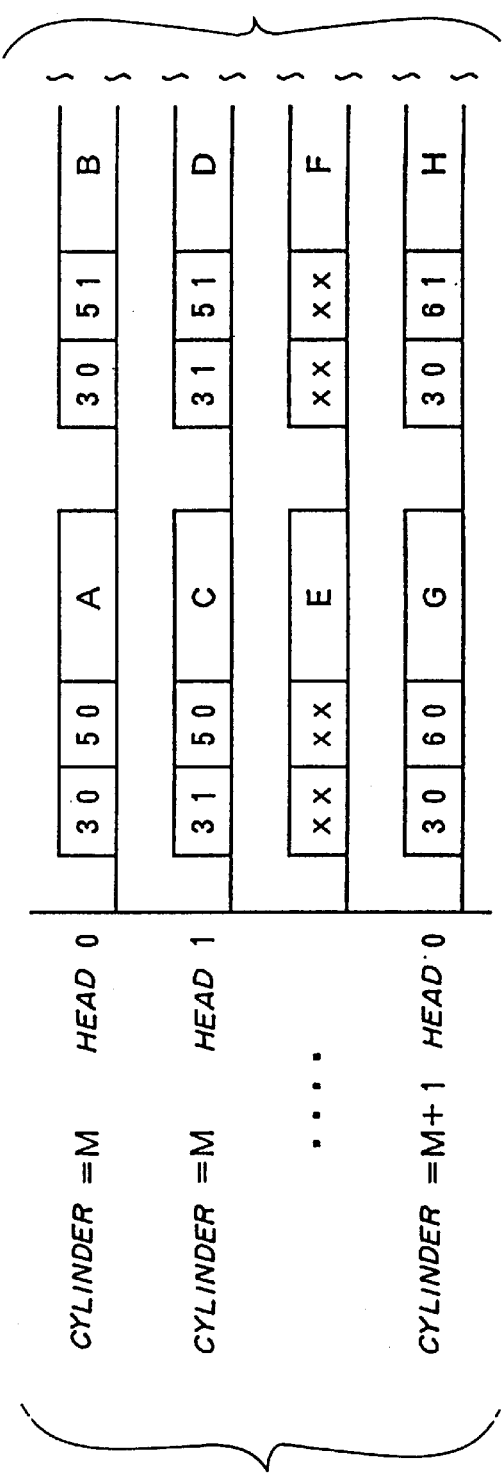

FIGS. 18A and 18B show a construction according to a second variation of the second embodiment shown in FIGS. 16A and 16B. The construction of FIG. 18A is similar to the construction of FIG. 16A in that the first and second synchronization areas SB1 and SB2 are provided so as to precede the data area. However, the servo information does not include the cylinder information in the construction of FIG. 18A. As shown in FIG. 18B, the synchronous code that varies depending on the head address, that is, depending on the recording surface, is written in the first synchronization area SB1. For example, the synchronous codes "30"–"3N" are written in SB1. However, the second byte of the synchronous code, that is, the synchronous code in the second synchronization area SB2 is constructed such that the lower nibble (4 bits) varies sector to sector ("X0", "X1", . . . ) so as to serve as part of the sector address, and the upper nibble (4 bits) varies cylinder to cylinder ("5X", "6X", . . . ) so as to serve as part of the cylinder address.

Accordingly, it is possible to recognize the head address, the sector address and the cylinder address by reading the synchronous code. Thus, the cylinder address can be eliminated from the servo information.

In the constructions of FIGS. 16A–18B, when the addresses are to be recognized in a writing operation, the data area is accessed before the writing operation so as to confirm whether or not the proper synchronous code can be read.

The present invention is not limited to the above described embodiments, and variations and modifications may be made without departing from the scope of the present invention.

What is claimed is:

1. A read/write apparatus provided with a predetermined number of recording media having servo information, including a servo mark and cylinder address information, recorded in a plurality of servo areas provided at predetermined intervals on each track on each of the recording media, wherein information is written to and read from a target sector by a head based on sector address information and an identifier of said head, said read/write apparatus comprising:

sector address recognition means for detecting and monitoring an interval of adjacent servo marks recorded on each of said recording media, wherein, individual areas for storing said sector address information are omitted from said recording media, and for generating a sector pulse when a predetermined count is reached after a deteicton of the servo mark on the condition that said interval of the adjacent servo marks is a preset interval, so that the address of said target sector accessed by said head is recognized; and head identifier recognition means for recognizing the identifier of said head on the basis of one of an arrangement of said servo information on each recording surface of said recording media and an arrangement of predetermined information for reading data from each of said recording media.

2. The read/write apparatus as claimed in claim 1, wherein said sector address recognition means comprises:

a counting part for starting a count when said servo mark is detected;

a monitoring part for detecting and monitoring an interval between the adjacent servo marks; and a sector pulse generating part for generating a sector pulse when the count in said counting part reaches a predetermined value and when the interval between the adjacent servo marks is a preset interval.

3. The read/write apparatus as claimed in claim 2, wherein said monitoring part inhibits generation of said sector pulse by said sector pulse generating part when the interval of the adjacent servo marks is not a preset interval, and outputs a signal for inhibiting writing to said target sector.

4. The read/write apparatus as claimed in claim 1, wherein said servo information is written at mutually unevenly displaced positions on different recording surfaces of said recording mediums, and said head identifier recognition means recognizes the identifier of said head that is selected, on the basis of one of the position at which said servo information is read and a time required to switch to said head that is selected.

5. The read/write apparatus as claimed in claim 4, further comprising means for specifying a time required to switch from said head which reads said servo information to said head that is selected.

6. The read/write apparatus as claimed in claim 1, wherein a frame number is attached to the servo information such that the frame number produces an uneven difference with respect to all other frame numbers in alignment, and said head identifier recognition means recognizes the identifier of said head that is selected on the basis of the frame number read by a first head and on the basis of the frame number read by a second head.

7. The read/write apparatus as claimed in claim 6, further comprising means for specifying differences between the frame number read by said first head and the frame number read by said second head that is selected so that the head identifier can be recognized by knowing a difference between the frame numbers.

8. The read/write apparatus as claimed in claim 1, wherein the head identifier information of the head is recorded in a predetermined area of each recording surface of the recording mediums so that said head identifier recognition means recognizes the head identifier on the basis of said head identifier information read by said head.

9. The read/write apparatus as claimed in claim 1, wherein individual areas for storing an identifier of said head are omitted from said recording media.

10. The read/write apparatus as claimed in claim 2, wherein individual areas for storing an identifier of said head are omitted from said recording media.

11. The read/write apparatus as claimed in claim 4, wherein individual areas for storing an identifier of said head are omitted from said recording media.

12. The read/write appartus as claimed in claim 6, wherein individual areas for storing an identifier of said head are omitted from said recording media.

\* \* \* \* \*